United States Patent Office 3,442,980
Patented May 6, 1969

3,442,980
FLAME-RETARDANT ABS GRAFT POLYMER BLENDS
Thomas S. Grabowski, Vienna, W. Va., assignor to Borg-Warner Corporation, Chicago, Ill., a corporation of Illinois
No Drawing. Filed Apr. 26, 1966, Ser. No. 545,239
Int. Cl. C09k 3/28; C08f 33/00
U.S. Cl. 260—880                                6 Claims

ABSTRACT OF THE DISCLOSURE

Flame-retardant graft polymer blends of halogen-substituted carboxylic acids and/or acid anhydrides with acrylonitrile-butadiene-styrene graft polymer compositions.

---

This invention relates to flame-retardant graft polymer blends and more particularly to flame-retardant graft polymer blends of halogen-substituted carboxylic acids and/or acid anhydrides with ABS graft polymer materials.

It is well known that many of the graft polymer blends are inherently flammable, and for this reason, are somewhat limited in certain applications. For example, applications which require fireproof materials, such as construction materials, are limited to flame-retardant graft polymers. Many attempts have been made to render graft polymers flame-retardant by adding flame-retardant additives as well as by blending with flame-resistant materials. The addition of many of these flame-retardant materials to graft polymers has resulted in alteration of their physical and chemical properties as well as processing characteristics. Addition of some of the chlorinated materials, such as polyvinyl chloride, has also had a tendency to substantially reduce their processing temperatures and when the graft polymers are compounded with a significant amount of chlorinated compound therein, it is necessary to process at comparatively low temperatures. Also, it should be noted that if normal ABS processing temperatures are utilized, a certain amount of degradation occurs in the chlorinated portion of the blending components.

It has been found that halogen-substituted carboxylic acids and/or acid anhydrides may be added to ABS graft polymers to substantially improve their flame-resistant properties with little or no change in their physical properties. It has further been found that the halogen-substituted carboxylic acids and/or acid anhydrides may be blended with ABS graft polymer within the normal processing temperatures of the graft polymers.

Generally stated, this invention is directed to the blending of chloro- and/or bromo-substituted carboxylic acids and/or acid anhydrides with a variety of ABS graft polymers to improve upon their flame-retardant properties. From about 1 to 10 percent by weight of compounds that are known to contribute to flame-retardancy, such as antimony oxide and other antimony compounds, may also be added to the blend. The blends of this invention may be compounded and molded even though they contain large amounts of chlorine or bromine, at relatively high temperatures. It is especially significant that the blends of this invention may be compounded and will remain stable under normal processing conditions.

When blending the halogen-substituted carboxylic acids and/or acid anhydride with ABS graft polymers, the acid and/or anhydride may be blended in amounts from about 5 percent by weight to about 50 percent by weight of the total composition, and preferably in amounts from about 5 to about 25 percent by weight of the total composition. The graft copolymer correspondingly will comprise from about 94 percent by weight to about 50 percent by weight of the total composition. It has been found that additional flame-retardant materials or materials which contribute to flame-retardancy, such as antimony oxide, may be added in amounts from about 1 to about 10 percent by weight of the total composition.

The preferred halogen-substituted carboxylic acids and/or acid anhydride is 1,2,3,4,9,9-hexachloro-1,4,4a,5,6,7,8,8a-octahydro-1,4-methenonaphthalene - 6,7 - dicarboxylic acid anhydride. Other halo-substituted compounds such as 5,6,7,8,9,9-hexachloro - 1,2,3,4,4a,5,8,8a - octahydro - 5,8 - metheno - 2,3 - naphthalenedicarboxylic acid; 5,6,7,8,9,9 - hexachloro - 2 - carboxy - 1,2,3,4,4a,5,8,8a-octahydro - 5,8 - metheno-2-naphthaleneacetic acid; 5,6,7,8,9,9-hexachloro - 3 - carboxy - 1,2,3,4,4a,5,8,8a-octahydro - 5,8 - metheno-2-naphthaleneacetic acid; 5,6,7,8,9,9-hexachloro - 1,2,3,4,4a,5,8,8a-octahydro - 5,8-metheno-2-naphthalene - succinic acid; 5,6,7,8,9,9-hexachloro-1,2,3,4,4a,5,8,8a - octahydro - 5,8-metheno - 2 - naphthalene-malonic acid; 5,6,7,8,9,9 - hexabromo - 1,2,3,4,4a,5,8,8a-octahydro - 5,8 - metheno - 2,3 - naphthalenedicarboxylic acid; 5,6,7,8,9,9 - hexabromo - 2 - carboxy-1,2,3,4,4a,5,8,8a - octahydro - 5,8-metheno - 2 - naphthaleneacetic acid; 5,6,7,8,9,9 - hexabromo - 1,2,34,4a,5,8,8a - octahydro-5,8-metheno - 2 - naphthalene-succinic acid, and the like may also be used. The chlorine and bromine substituted carboxylic acids and/or acid anhydrides of this invention may be prepared by the Diels-Alder addition of hexahalocyclopentadiene and tetrahydrophthalic anhydride or derivatives of the anhydride. The preferred method of preparing these compounds may be obtained from United States Patent 3,152,172 wherein hexachlorocyclopentadiene is reacted with tetrahydrophthalic anhydride and derivatives thereof.

The graft polymers utilized in this invention are those prepared from conjugated diene, monovinyl aromatic hydrocarbon and acrylic acid nitrile monomer. A graft polymer is a polymer prepared by first polymerizing a monomer (or mixture of monomers) with subsequent polymerization of a second monomer or group of monomers onto the product of the first polymerization. The first polymerization prepares what is hereinafter referred to as the rubbery backbone.

The specific graft polymers utilized in this invention are prepared by first polymerizing a conjugated diene, such as butadiene, or a conjugated diene in the presence of a monovinyl aromatic hydrocarbon such as styrene, to provide a polymerized diene rubbery backbone such as polybutadiene or a butadiene-styrene copolymer backbone. Thereafter, a second set of monomers are grafted to the rubbery backbone to complete the graft polymer. This is accomplished by the addition and interaction under polymerizing conditions of an acrylic acid nitrile monomer or monomers and a vinyl aromatic hydrocarbon monomer or monomers exemplified respectively by acrylonitrile and styrene.

The backbone, i.e., conjugated diene polymer or copolymer, is prepared so as to comprise from about 60 percent to about 10 percent by weight of the total composition and the acrylic acid nitrile and aromatic monovinyl hydrocarbon that is polymerized in the presence of the backbone polymer of copolymer comprises from about 40 percent to about 90 percent by weight of the total composition.

The acrylic acid nitrile preferably comprises from about 5 percent to about 35 percent by weight of the three-component organic mixture and the monovinyl aromatic hydrocarbon comprises from about 30 percent to about 80 percent of the total composition.

The term monovinyl aromatic hydrocarbon is meant to include compounds such as styrene, α-methylstyrene, vinyl toluene, vinyl xylene, ethylvinylbenzene, isopropyl styrene, chlorostyrene, dichlorostyrene, ethylchlorostyrene, mixtures thereof and the like. The acrylic acid nitrile compounds include compounds such as acrylonitrile, methacrylonitrile, ethacrylonitrile, chloroacrylonitrile, mixtures thereof and the like.

The specific graft polymers utilized in the examples ranged from compositions containing about 10 percent by weight to about 50 percent by weight of polybutadiene with from about 20 percent to about 30 percent by weight acrylonitrile, and from about 30 percent to about 60 percent by weight styrene polymerized in the presence of polybutadiene. As mentioned, other monomers may be substituted to prepare the graft polymers, e.g., a styrene-butadiene substrate may be substituted for the polybutadiene.

The examples set forth in the tables below were prepared by first polymerizing the monomers above-mentioned to prepare the graft polymer with subsequent blending of the ABS graft polymers and halogen-substituted carboxylic acids and/or acid anhydride in a Banbury mixer. The examples are meant to illustrate the blends of this invention and are not intended to limit the generally broad scope thereof. All parts are by weight unless otherwise indicated.

TABLE 1

|  | 1 | 2 | 3 | 4 | 5 | 6 | 7 | 8 |
|---|---|---|---|---|---|---|---|---|
| Graft Polymer of 51% Stryene, 29% Acrylonitrile, 20% Butadiene | 100 | 95 | 90 | 85 | 80 | 75 | 65 | 40 |
| 1,2,3,4,9,9-hexachloro-1,4,4a,5,6,7,8,8a-octahydro-1,4-methenonaphthalene-6,7-dicarboxylic anhydride |  | 5 | 10 | 15 | 20 | 25 | 35 | 50 |
| Antimony Oxide | 0 | 0 | 0 | 0 | 0 | 0 | 0 | 0 |
| Dibutyl Tin Maleate | 2.0 | 2.0 | 2.0 | 2.0 | 2.0 | 2.0 | 2.0 | 2.0 |
| Lubricant | 1.0 | 1.0 | 1.0 | 1.0 | 1.0 | 1.0 | 1.0 | 1.0 |
| Tensile (p.s.i. at yeidl), 1/8" specimen, ASTM D-638-61, 0.2"/Minute | 6,000 | 6,100 | 6,200 | 6,250 | 6,300 | 6,150 | 5,500 |  |
| Elongation (percent) | 95 | 50 | 25 | 15 | 15 | 1 | 4 |  |
| HDT 1/2 x 1/2 at 16 p.s.i. (° F.)[1] | 219 | 218 | 216 | 206 | 205 | 209 | 213 |  |
| HDT 1/2 x 1/2 at 264 p.s.i. (° F.)[1] | 198 | 188 | 184 | 178 | 182 | 180 | 188 |  |
| Melt Index at 410° F | 0.8A1 | 1.4A1 | 2.2A1 | 1.7A½ | 1.6B1 | 2.7B1 | 1.7B½ |  |
| Rockwell Hardness R, ASTM D-785-62, Method A, 1/4" Specimen | 105 | 105 | 105 | 104 | 104 | 102 | 100 |  |
| Flexural Modulus ($\times 10^5$), 1/8" x 1" x 4" bars tested at 73° F., ASTM D-790-61, 0.05"/Minute | 3.2 | 3.4 | 3.3 | 3.5 | 3.7 | 4.0 | 4.1 |  |
| Flexural Strength (p.s.i.) | 9,600 | 9,900 | 10,300 | 10,600 | 9,950 | 9,000 | 6,900 |  |
| Notched Izod Impact (73° F. in ft. lbs./in. of notch), 1/8" specimen, ASTM D-256-56, Method A | 6.2 | 6.1 | 6.1 | 4.9 | 2.1 | 1.4 | 0.7 |  |
| ASTM Flammability [2] | 1.65 | 1.46 | 1.38 | 1.34 | 1.35 | nb | nb | nb |

[1] Unannealed 1/2 x 1/2 x 5" bars, ° F. at 10 mils deflection.
[2] Flamability of rigid plastics over 0.050" thickness. ASTM D-636-56T. Values will be in inches/minute, self-extinguishing (se) or non-burning (nb).

TABLE 2

|  | 9 | 10 | 11 | 12 | 13 | 14 | 15 | 16 |
|---|---|---|---|---|---|---|---|---|
| Graft Polymer of 51% Styrene, 29% Acrylonitrile, 20% Butadiene | 95 | 85 | 75 | 65 | 50 | 100 | 95 | 90 |
| 1,2,3,4,9,9-hexachloro-1,4,4a,5,6,7,8,8a-octahydro-1,4-methenonaphthalene-6,7-dicarboxylic anhydride | 5 | 15 | 25 | 35 | 50 |  | 5 | 10 |
| Antimony Oxide | 1.0 | 1.0 | 1.0 | 1.0 | 1.0 | 7 | 7 | 7 |
| Dibutyl Tin Maleate | 2.0 | 2.0 | 2.0 | 2.0 | 2.0 | 2.0 | 2.0 | 2.0 |
| Lubricant | 1.0 | 1.0 | 1.0 | 1.0 | 1.0 | 1.0 | 1.0 | 1.0 |
| Tensile (p.s.i. at yield), 1/8" specimen, ASTM D-638-61, 0.2"/Minute | 6,100 | 6,400 | 6,250 | 5,400 |  | 5,950 | 6,000 | 6,100 |
| Elongation (percent) | 50 | 15 | 6 | 4 |  | 75 | 25 | 2 |
| HDT 1/2 x 1/2 at 16 p.s.i. (° F.)[1] | 210 | 214 | 209 | 214 |  | 219 | 216 | 209 |
| HDT 1/2 x 1/2 at 264 p.s.i. (° F.)[1] | 187 | 184 | 183 | 191 |  | 190 | 187 | 185 |
| Melt Index at 410° F | 1.2A1 | 1.7A½ | 2.5B1 | 1.6B½ |  | 1.8A1 | 1.4A1 | 2.3A1 |
| Rockwell Hardness R, ASTM D-785-62, Method A, 1/4" specimen | 104 | 104 | 101 | 100 |  | 105 | 105 | 105 |
| Flexural Modulus ($\times 10^5$), 1/8" x 1" x 4" bars tested at 73° F. ASTM D-790-61, 0.05"/minute | 3.3 | 3.4 | 3.9 | 4.3 |  | 3.5 | 3.5 | 3.5 |
| Flexural Strength (p.s.i.) | 10,250 | 10,400 | 8,700 | 7,600 |  | 9,800 | 10,200 | 10,300 |
| Notched Izod Impact (73° F. in ft. lbs./in. of notch), 1/8" specimen, ASTM D-256-56, Method A | 4.4 | 3.0 | 1.3 | 0.6 |  | 2.7 | 2.2 | 1.8 |
| ASTM Flammability [2] | 1.25 | 0.98 | nb | nb | nb | 1.57 | 1.27 | 0.98 |

[1] Unannealed 1/2 x 1/2 x 5" bars, ° F. at 10 mils deflection.
[2] Flammability of Rigid Plastics over 0.050" thickness. ASTM D-636-56T. Values will be in inches/minute, self-extinguishing (se) or non-burning (nb).

TABLE 3

|  | 17 | 18 | 19 | 20 | 21 | 22 | 23 | 24 |
|---|---|---|---|---|---|---|---|---|
| Graft Polymer of 51% Styrene, 29% Acrylonitirle, 20% Butadiene | 85 | 80 | 75 | 95 | 85 | 75 | 65 | 50 |
| 1,2,3,4,9,9-hexachloro-1,4,4a,5,6,7,8,8a-octahydro-1,4-methenonaphthalene-6,7-dicarboxylic anhydride | 15 | 20 | 25 | 5 | 15 | 25 | 35 | 50 |
| Antimony Oxide | 7 | 7 | 7 | 10 | 10 | 10 | 10 | 10 |
| Dibutyl Tin Maleate | 2.0 | 2.0 | 2.0 | 2.0 | 2.0 | 2.0 | 2.0 | 2.0 |
| Lubricant | 1.0 | 1.0 | 1.0 | 1.0 | 1.0 | 1.0 | 1.0 | 1.0 |
| Tensile (p.s.i. at yield), 1/8" specimen, ASTM D-638-61T, 0.2"/minute | 6,100 | 6,300 | 6,400 | 6,300 | 6,400 | 6,300 | 5,500 |  |
| Elongation (percent) | 2 | 8 | 6 | 25 | 10 | 7 | 4 |  |
| HDT 1/2 x 1/2 at 16 p.s.i. (° F.)[1] | 208 | 199 | 207 | 214 | 207 | 207 | 213 |  |
| HDT 1/2 x 1/2 at 264 p.s.i. (° F.)[1] | 180 | 176 | 184 | 188 | 181 | 185 | 189 |  |
| Melt Index at 410° F | 1.8A½ | 1.6B1 | 2.3B1 | 1.2A1 | 1.7A½ | 2.4B1 | 1.7B½ |  |
| Rockwell Hardness R, ASTM D-785-62, Method A, 1/4" specimen | 104 | 104 | 102 | 104 | 104 | 101 | 100 |  |
| Flexural Modulus ($\times 10^5$), 1/8" x 1" x 4" bars tested at 73° F., ASTM D-790-61, 0.05"/minute | 3.6 | 3.8 | 3.8 | 3.5 | 3.7 | 4.1 | 4.3 |  |
| Flexural Strength (p.s.i.) | 10,550 | 10,000 | 8,600 | 9,700 | 10,500 | 8,600 | 7,400 |  |
| Notched Izod Impact (73° F. in ft. lbs./in. of notch), 1/8" specimen, ASTM D-256-56, Method A | 1.4 | 1.2 | 0.9 | 2.0 | 1.3 | 1.0 | 0.5 |  |
| ASTM Flammability[2] | nb | nb | nb | 1.29 | nb | nb | nb | nb |

[1] Unannealed 1/2 x 1/2 x 5" bars, ° F. at 10 mils deflection.
[2] Flammability of rigid plastics over 0.050" thickness. ASTM D-636-56T. Values will be in inches/minute, self-extinguishing (se) or non-burning (nb).

TABLE 4

|  | 25 | 26 | 27 | 28 | 29 | 30 | 31 | 32 |
|---|---|---|---|---|---|---|---|---|
| Graft Polymer of 35% Styrene, 18% Acrylonitrile, 47% Butadiene | 100 | 95 | 85 | 75 | 65 | 50 | 65 | 50 |
| 1,2,3,4,9,9-hexachloro-1,4,4a,5,6,7,8,8a-octahydro-1,4-metheno-naphthalene-6,7-dicarboxylic anhydride | | 5 | 15 | 25 | 35 | 50 | 35 | 50 |
| Antimony Oxide | | | | | | | 1.0 | 1.0 |
| Dibutyl Tin Maleate | 2.0 | 2.0 | 2.0 | 2.0 | 2.0 | 2.0 | 2.0 | 2.0 |
| Lubricant | 1.0 | 1.0 | 1.0 | 1.0 | 1.0 | 1.0 | 1.0 | 1.0 |
| Tensile (p.s.i. at yield) | 2,100 | 2,300 | 2,400 | 2,550 | 2,550 | | 2,550 | |
| Elongation (percent) | 150 | 168 | 161 | 140 | 30 | | 15 | |
| HDT ½ x ½ at 16 p.s.i. (° F.) | 209 | 199 | 195 | 202 | 207 | | 207 | |
| HDT ½ x ½ at 264 p.s.i. (° F.) | 158 | 146 | 158 | 163 | 163 | | 167 | |
| Melt Index at 410° F | .03A3 | .03A3 | 0.2A3 | 0.3A3 | 0.4A1 | | 0.3A1 | |
| Shore D Hardness, ASTM D-1706-59T | 63 | 65 | 65 | 68 | 70 | | 70 | |
| Flexural Modulus (×10⁵) | 1.1 | 1.2 | 1.4 | 1.7 | 1.8 | | 1.8 | |
| Flexural Strength (p.s.i.) | 3,800 | 3,950 | 4,050 | 3,950 | 4,000 | | 3,950 | |
| Notched Izod Impact | 7.8 | 8.2 | 7.6 | 4.9 | 1.1 | | 1.4 | |
| ASTM Flammability | 1.51 | 1.35 | 1.11 | 0.81 | nb | nb | nb | nb |

For explanation of physical tests, see Tables 1, 2, and 3.

TABLE 5

|  | 33 | 34 | 35 | 36 | 37 |
|---|---|---|---|---|---|
| Graft Polymer of 35% Styrene; 18% Acrylonitrile; 47% Butadiene | 95 | 85 | 75 | 65 | 50 |
| 1,2,3,4,9,9-hexachloro-1,4,4a,5,6,7,8,8a-octahydro-1,4-methenonaphthalene-6,7-dicarboxylic anhydride | 5 | 15 | 25 | 35 | 50 |
| Antimony Oxide | 7 | 7 | 7 | 10 | 10 |
| Dibutyl Tin Maleate | 2.0 | 2.0 | 2.0 | 2.0 | 2.0 |
| Lubricant | 1.0 | 1.0 | 1.0 | 1.0 | 1.0 |
| Tensile (p.s.i. at yield) | 2,300 | 2,450 | 2,600 | 2,550 | |
| Elongation (percent) | 155 | 180 | 120 | 15 | |
| HDT ½ x ½ at 16 p.s.i. (° F.) | 200 | 197 | 204 | 204 | |
| HDT ½ x ½ at 264 p.s.i. (° F.) | 158 | 160 | 164 | 168 | |
| Melt Index at 410 F | .04A3 | 0.2A3 | 0.6A3 | 0.3A1 | |
| Shore D Hardness, ASTM D-1706-59T | 65 | 65 | 67 | 70 | |
| Flexural Modulus (×10⁵) | 1.2 | 1.4 | 1.6 | 1.8 | |
| Flexural Strength (p.s.i.) | 3,950 | 4,100 | 3,750 | 3,950 | |
| Notched Izod Impact | 8.2 | 7.7 | 4.2 | 1.2 | |
| ASTM Flammability | 1.25 | nb | nb | nb | |

For explanation of physical tests, see Tables 1, 2, and 3.

TABLE 6

|  | 38 | 39 | 40 | 41 | 42 | 43 | 44 |
|---|---|---|---|---|---|---|---|
| Graft Polymer of 57% Styrene, 31% Acrylonitrile, 12% Butadiene | 100 | 95 | 85 | 75 | 95 | 85 | 75 |
| 1,2,2,3,4,9,9,-hexachloro-1,4,4a,5,6,7,8,8a-octahydro-1,4-methenonaphthalene-6,7-dicarboxylic anhydride | | 5 | 15 | 25 | 5 | 15 | 25 |
| Antimony Oxide | | | | | 7 | 7 | 7 |
| Dibutyl Tin Maleate | 2.0 | 2.0 | 2.0 | 2.0 | 2.0 | 2.0 | 2.0 |
| Lubricant | 1.0 | 1.0 | 1.0 | 1.0 | 1.0 | 1.0 | 1.0 |
| Tensile (p.s.i. at yield) | 7,800 | 8,000 | 8,100 | 6,850 | 8,050 | 8,150 | 6,850 |
| Elongation (percent) | 20 | 25 | 10 | 4 | 20 | 10 | 4 |
| HDT ½ x ½ at 16 p.s.i. (° F.) | 217 | 216 | 207 | 210 | 217 | 205 | 209 |
| HDT ½ x ½ at 264 p.s.i. (° F.) | 193 | 193 | 184 | 187 | 192 | 181 | 188 |
| Melt Index at 410° F | 0.4B1 | 2.0A1 | 2.0A½ | *TF | 1.8A1 | 1.3A½ | 1.7B½ |
| Rockwell Hardness R | 112 | 114 | 118 | 110 | 112 | 114 | 110 |
| Flexural Modulus (×10⁵) | 4.0 | 4.0 | 4.2 | 4.7 | 4.1 | 4.2 | 4.6 |
| Flexural Strength (p.s.i.) | 12,400 | 12,900 | 13,350 | 11,600 | 12,800 | 12,600 | 10,700 |
| Notched Izod Impact | 1.4 | 1.1 | 0.8 | 0.5 | 0.8 | 0.8 | 0.6 |
| ASTM Flammability | 1.55 | 1.59 | 1.39 | se | 1.38 | nb | nb |

For explanation of physical tests, see Tables 1, 2, and 3.

*Too fast for test.

In the examples, the polymeric blends were prepared from graft polymers containing polybutadiene rather than polybutadiene-styrene copolymers, however, as indicated, these graft polymers are equally applicable to this invention. It will be noted that the physical properties are not greatly altered through addition of high chlorine content materials and the flame-retardancy of the resulting blend is far superior to that of the graft polymers by themselves.

It should be understood that while this invention has been described in connection with certain specific blends containing specific amounts of chlorinated acids and/or anhydrides, that this is by way of illustration and not limitation, and that the scope of the invention is defined solely by the appended claims which should be construed as broadly as is consistent with the prior art.

What is claimed is:

1. A thermoplastic, flame-retardant blend, comprising from about 5 to about 50 percent by weight of chlorine and bromine substituted carboxylic acids and/or acid anhydrides selected from the group consisting of 1,2,3,4,9,9 - hexachloro-1,4,4a,5,6,7,8,8a-octahydro-1,4-methanonaphthalene-6,7-dicarboxylic acid anhydride;
5,6,7,8,9 - hexachloro - 1,2,3,4,4a,5,8,8a-octahydro-5,8-methano-2,3-naphthalenedicarboxylic acid;
5,6,7,8,9,9 - hexachloro-2-carboxy-1,2,3,4,4,5,8,8a-octahydro-5,8-methano-2-naphthaleneacetic acid;
5,6,7,8,9,9 - hexachloro - 3-carboxy - 1,2,3,4,4a,5,8,8a-octahydro-5,8-methano-2-naphthaleneacetic acid;
5,6,7,8,9,9 - hexachloro-1,2,3,4,4a,5,8,8a-octahydro-5,8-methano-2-naphthalenesuccinic acid;
5,6,7,8,9,9 - hexachloro-1,2,3,4,4a,5,8,8a-octahydro-5,8-methano-2-naphthalenemalonic acid;
5,6,7,8,9,9 - hexabromo-1,2,3,4,4a,5,8,8a-octahydro-5,8-methano-2,3-naphthalenedicarboxylic acid;
5,6,7,8,9,9 - hexabromo - 2 - carboxy-1,2,3,4,4a,5,8,8a-octahydro-5,8-methano-2-naphthaleneacetic acid; and
5,6,7,8,9,9 - hexabromo-1,2,3,4,4a,5,8,8a-octahydro-5,8-methano-2-naphthalenesuccinic acid and from about 95 to about 50 percent by weight acrylonitrile-butadiene-styrene graft polymer.

2. The thermoplastic flame-retardant blend of claim 1 wherein the chlorine and bromine substituted carboxylic acid and/or acid anhydride comprises from about 5 to about 25 percent by weight of the total composition, and the graft polymer correspondingly comprises from about 75 to about 95 percent by weight of the total composition.

3. The thermoplastic blend of claim 1 wherein the graft polymer is prepared by polymerizing a conjugated diene and thereafter polymerizing a monovinyl aromatic hydrocarbon and an acrylic acid nitrile in the presence of said conjugated diene.

4. The thermoplastic blend of claim 1 wherein the graft polymer is prepared by polymerizing from about 40 percent to about 90 percent by weight of a monovinyl aromatic hydrocarbon and an acrylic acid nitrile in the presence of from about 10 percent to about 60 percent by weight of a polymerized product selected from the group consisting of conjugated diene homopolymers and conjugated diene-monovinyl aromatic hydrocarbon copolymers.

5. The thermoplastic blend of claim 1 wherein the chlorine and bromine substituted dicarboxylic acid anhydride is 1,2,3,4,9,9-hexachloro-1,4,4a,5,6,7,8,8a-octahydro-1,4-methanonaphthalene-6,7-dicarboxylic anhydride.

6. The thermoplastic blend of claim 1 wherein an antimony oxide flame-retardant material is added in an amount of from about 1 percent to 10 percent of the total composition.

References Cited

UNITED STATES PATENTS

| | | | |
|---|---|---|---|
| 2,967,842 | 1/1961 | Roberts | 260—880 XR |
| 3,152,172 | 10/1964 | Roberts et al. | 260—346.6 XR |
| 3,269,963 | 8/1966 | Ilgemann et al. | 260—876 XR |
| 3,288,813 | 11/1966 | Kleiman | 260—45.8 XR |
| 3,365,470 | 1/1968 | Schmerling | 260—346.6 |

GEORGE F. LESMES, *Primary Examiner.*

U.S. Cl. X.R.

260—45.75, 45.8, 346.6

UNITED STATES PATENT OFFICE
CERTIFICATE OF CORRECTION

Patent No. 3,442,980                                                  May 6, 1969

Thomas S. Grabowski

It is certified that error appears in the above identified patent and that said Letters Patent are hereby corrected as shown below:

Column 5, line 72, "5,6,7,8,9 -" should read -- 5,6,7,8,9,9 - --; line 74, "1,2,3,4,4,5,8,8a-" should read -- 1,2,3,4,4a,5,8,8a- --.

Signed and sealed this 14th day of April 1970.

(SEAL)
Attest:

Edward M. Fletcher, Jr.                                  WILLIAM E. SCHUYLER, JR.
Attesting Officer                                                     Commissioner of Patents